United States Patent
Walster et al.

(10) Patent No.: US 6,920,472 B2
(45) Date of Patent: Jul. 19, 2005

(54) TERMINATION CRITERIA FOR THE INTERVAL VERSION OF NEWTON'S METHOD FOR SOLVING SYSTEMS OF NON-LINEAR EQUATIONS

(75) Inventors: G. William Walster, Cupertino, CA (US); Eldon R. Hansen, Los Altos, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 662 days.

(21) Appl. No.: 09/952,758

(22) Filed: Sep. 13, 2001

(65) Prior Publication Data

US 2003/0050946 A1 Mar. 13, 2003

(51) Int. Cl.$^7$ ............................................... G06F 7/38
(52) U.S. Cl. ............................................... 708/446
(58) Field of Search ............................. 708/200, 446, 708/440

(56) References Cited

U.S. PATENT DOCUMENTS

| | | | | |
|---|---|---|---|---|
| 5,220,524 A | * | 6/1993 | Hesson ........................ | 708/502 |
| 5,631,858 A | * | 5/1997 | Narita et al. ................. | 708/443 |
| 2004/0015830 A1 | * | 1/2004 | Reps ............................ | 717/104 |

OTHER PUBLICATIONS

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63–78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152–147. http://www.netlib.org/toms/681.

(Continued)

*Primary Examiner*—Chuong Dinh Ngo
(74) *Attorney, Agent, or Firm*—Park, Vaughan & Fleming LLP

(57) ABSTRACT

One embodiment of the present invention provides a system for finding the roots of a system of nonlinear equations within an interval vector $X=(X_1, \ldots, X_n)$, wherein the system of non-linear equations is specified by a vector function $f=(f_1, \ldots, f_n)$. The system operates by receiving a representation of the interval vector X (which is also called a box), wherein for each dimension, i, the representation of $X_i$ includes a first floating-point number, $a_i$, representing the left endpoint of $X_i$, and a second floating-point number, $b_i$, representing the right endpoint of $X_i$. Next, the system performs an interval Newton step on X to produce a resulting interval vector, X', wherein the point of expansion of the interval Newton step is a point, x, within the interval X, and wherein performing the interval Newton step involves evaluating $f(x)$ to produce an interval result $f^1(x)$. The system then evaluates a first termination condition, wherein the first termination condition is TRUE if: zero is contained within $f^1(x)$, $J(x,X)$ is regular (wherein $J(x,X)$ is the Jacobian of the function $f$ evaluated with respect to x over the box X); and X is contained within X'. If the first termination condition is TRUE, the system terminates the interval Newton method and records X' as a final bound.

24 Claims, 5 Drawing Sheets

OTHER PUBLICATIONS

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447–458.

R. B. Kearfott and G.W. Walster, "On Stopping Criteria in Verified Nonlinear Systems or Optimization Algorithms," ACM Trans. Math. Software, 26, vol. 3, Sep. 2000, pp. 323–351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter-Dependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

Publication: "Design, implementation and evaluation of the constraint language cc (FD)" by Pascal Van Hentenryck et al., The Journal of Logic Programming 37, 1998, pp. 139–164.

* cited by examiner $$X \equiv [\underline{x}, \bar{x}] \equiv \{x \in \Re^* | \underline{x} \leq x \leq \bar{x}\}$$

$$Y \equiv [\underline{y}, \bar{y}] \equiv \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})], \text{ if } 0 \notin Y$ $X/Y \subseteq \Re^*, \text{ if } 0 \in Y$

TERMINATION CRITERIA FOR THE INTERVAL VERSION OF NEWTON'S METHOD FOR SOLVING SYSTEMS OF NON-LINEAR EQUATIONS

RELATED APPLICATION

The subject matter of this application is related to the subject matter in a co-pending non-provisional application by the same inventors as the instant application and filed on the same day as the instant application entitled, "Termination Criteria for the One-Dimensional Interval Version of Newton's Method," having Ser. No. 09/927,270, and filing date Aug. 9, 2001.

BACKGROUND

1. Field of the Invention

The present invention relates to performing arithmetic operations on interval operands within a computer system. More specifically, the present invention relates to a method and an apparatus for using a computer system to find the roots of a system of non-linear equations using the interval version of Newton's method.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to find the roots of a nonlinear equation using Newton's method. The interval version of Newton's method works in the following manner. From the mean value theorem, $$f(x)-f(x^*)=(x-x^*)f'(\xi),$$

where $\xi$ is some generally unknown point between x and $x^*$. If $x^*$ is a zero of $f$ then $f(x^*)=0$ and, from the previous equation, $$x^*=x-f(x)/f'(\xi).$$

Let X be an interval containing both x and $x^*$. Since $\xi$ is between x and $x^*$, it follows that $\xi \in X$ Moreover, it follows that $f'(\xi) \in f'(X)$. Hence, $x^* \in N(x,X)$ where $$N(x,X)=x-f(x)/f'(X).$$

Temporarily assume $0 \in f'(X)$ so that $N(x,X)$ is a finite interval. Since any zero of $f$ in X is also in $N(x,X)$, the zero is in the intersection $X \cap N(x,X)$. Using this fact, we define a procedure for finding zero $x^*$. Let $X_0$ be an interval containing $x^*$. For $n=0, 1, 2, \ldots$, define $$x_n = m(X_n)$$

$$N(x_n,X_n)=x_n-f(x_n)/f'(X_n)$$

$$X_{n+1}=X_n \cap N(x_n,X_n).$$

Wherein $m(X)$ is the midpoint of the interval X. We call $x_n$ the point of expansion for the Newton method. It is not necessary to choose $x_n$ to be the midpoint of $X_n$. The only requirement is that $x_n \in X_n$ to assure that $x^* \in N(x_n,X_n)$. However, it is convenient and efficient to choose $x_n = m(X_n)$.

Roots of an interval equation can be intervals rather than points when the equation contains non-degenerate interval constants or parameters. Suppose the interval version of Newton's method to find the roots of a system of nonlinear equations has not yet satisfied the user-specified convergence tolerances. Then it is difficult to distinguish between the following three situations:

a) the current interval is a tight enclosure of a single interval root;

b) the current interval contains sufficiently distinct interval roots that they can be isolated with a reasonable amount of effort; and c) the current interval contains point and/or interval roots that are so close large with the existing wordlength.

What is needed is a method and an apparatus for terminating the interval version of Newton's root finding method for a system of nonlinear equations before iterations lose their practical value in isolating meaningfully distinct interval roots.

SUMMARY

One embodiment of the present invention provides a system for finding the roots of a system of nonlinear equations within an interval vector $X=(X_1, \ldots, X_n)$, wherein the system of non-linear equations is specified by a vector function $f=(f_1, \ldots, f_n)$. The system operates by receiving a representation of the interval vector X (which is also called a box), wherein for each dimension, i, the representation of $X_i$ includes a first floating-point number, $a_i$, representing the left endpoint of $X_i$, and a second floating-point number, $b_i$, representing the right endpoint of $X_i$.

Next, the system performs an interval Newton step on X to produce a resulting interval vector, X', wherein the point of expansion of the interval Newton step is a point, x, within the interval X, and wherein performing the interval Newton step involves evaluating $f(x)$ to produce an interval result $f^1(x)$. The system then evaluates a first termination condition, wherein the first termination condition is TRUE if: zero is contained within $f^1(x)$, J(x,X) is regular (wherein J(x, X) is the Jacobian of the function $f$ evaluated with respect to x over the box X); and X is contained within X'. If the first termination condition is TRUE, the system terminates the interval Newton method and records X' as a final bound.

In one embodiment of the present invention, if no termination condition is satisfied, the system returns to perform an interval Newton step on the box X'.

In one embodiment of the present invention, the system also evaluates a second termination condition, wherein the second termination condition is TRUE if a function of the width of the interval X' is less than a pre-specified value, $\epsilon_X$, and the magnitude of the function f over the interval X' is less than a pre-specified value, $\epsilon_F$. If the second termination condition is TRUE, the system terminates the interval Newton method and records X' as a final bound. (Note that the width of an interval $X_i=[\alpha_i, b_i]$ (denoted as $w(X_i)$) is simply $b_i-\alpha_i$. Also note that the magnitude of the function $f$ over the interval X' is the largest $|f_i(x)|$ for any $f_i$ that is part of the function $f$ and any $x \in X'$.

In a variation on this embodiment, the second termination condition is evaluated and the method possibly terminates before the first termination condition is evaluated.

In another variation, the second termination condition is evaluated only if J(x,X) is not proved to be regular. Note that the system can determine if J(x,X) is regular by first computing a pre-conditioned Jacobian, M(x,X)=BJ(x,X), wherein B is an approximate inverse of the center of J(x,X), and then attempting to solve M(x,X)(y-x)=r(x), where r(x)=-Bf(x).

In one embodiment of the present invention, the system determines whether J(x,X) is regular by attempting to invert the matrix formed by the left endpoints of the interval elements of M(x,X).

In one embodiment of the present invention, returning to perform an interval Newton step on the interval X' can involve splitting the interval X'.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
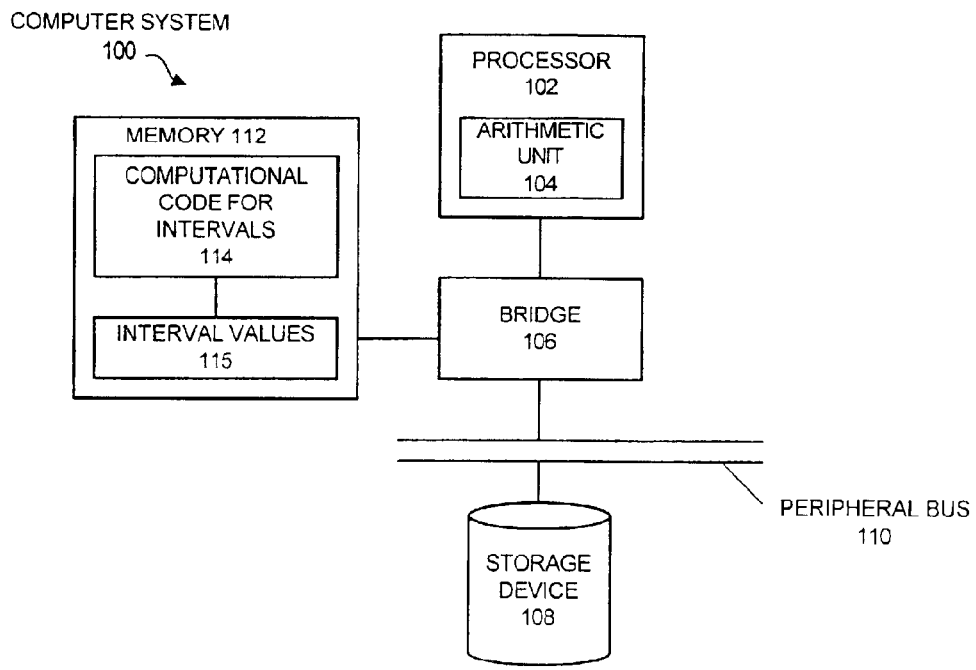
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 10 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
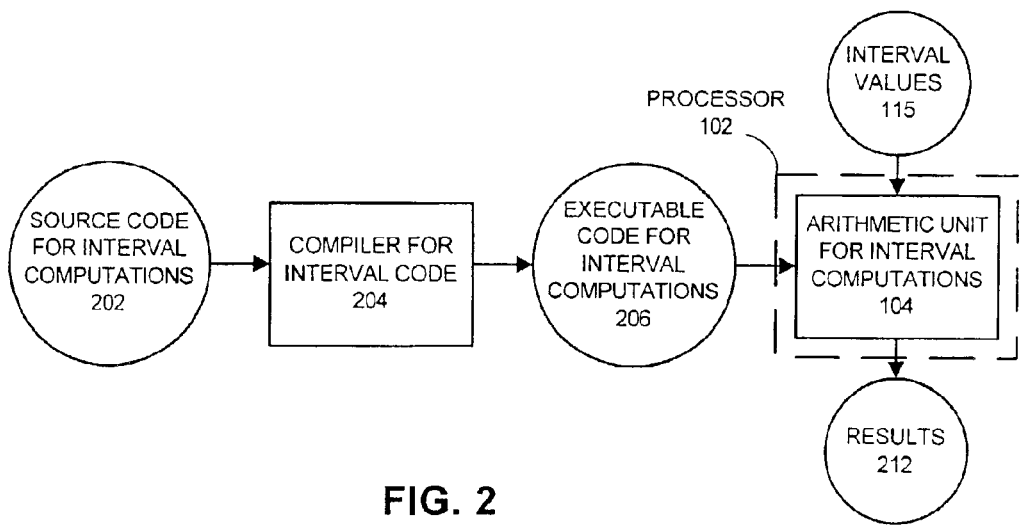
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
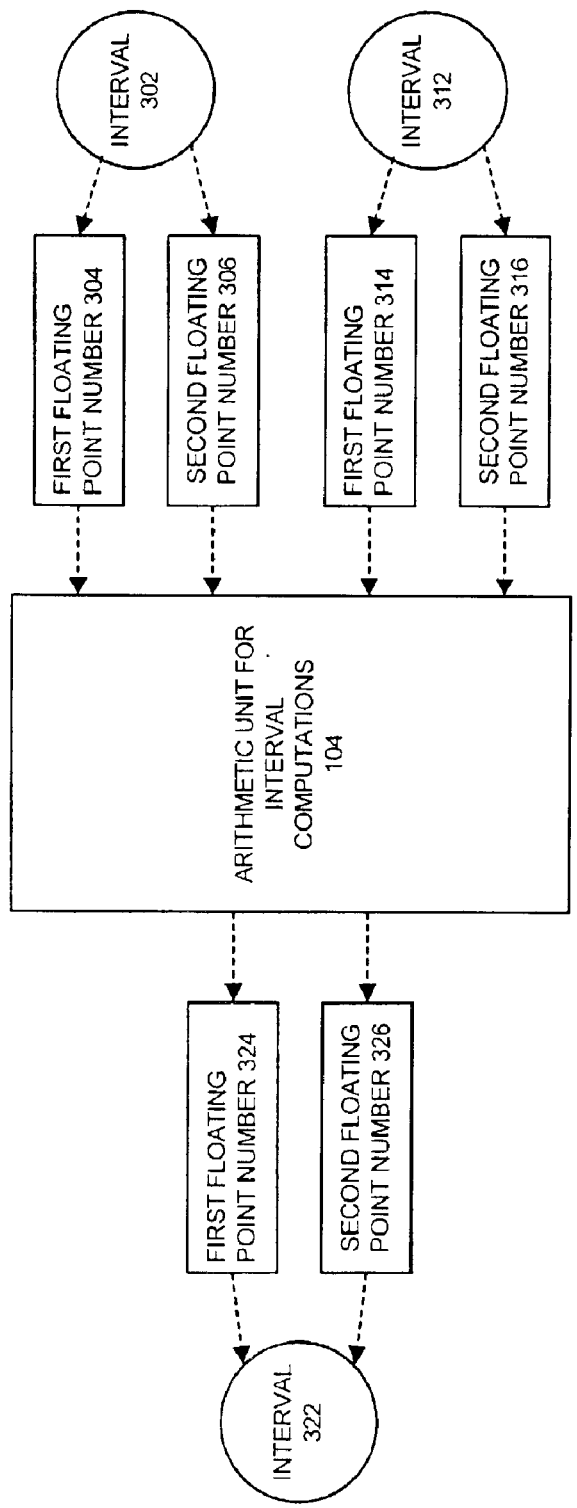
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
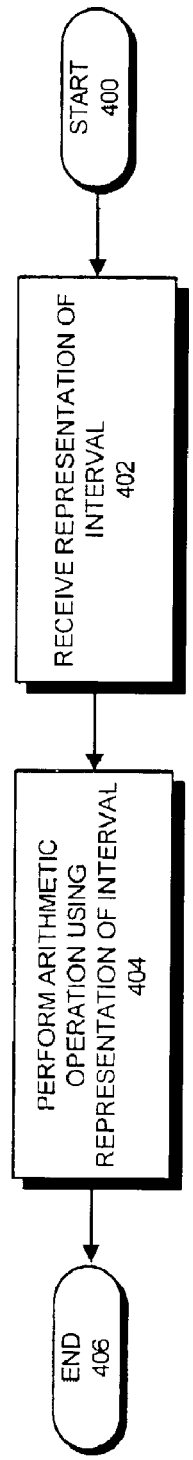
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Interval Version of Newton's Method for Systems of Nonlinear Equations

Figure 6:
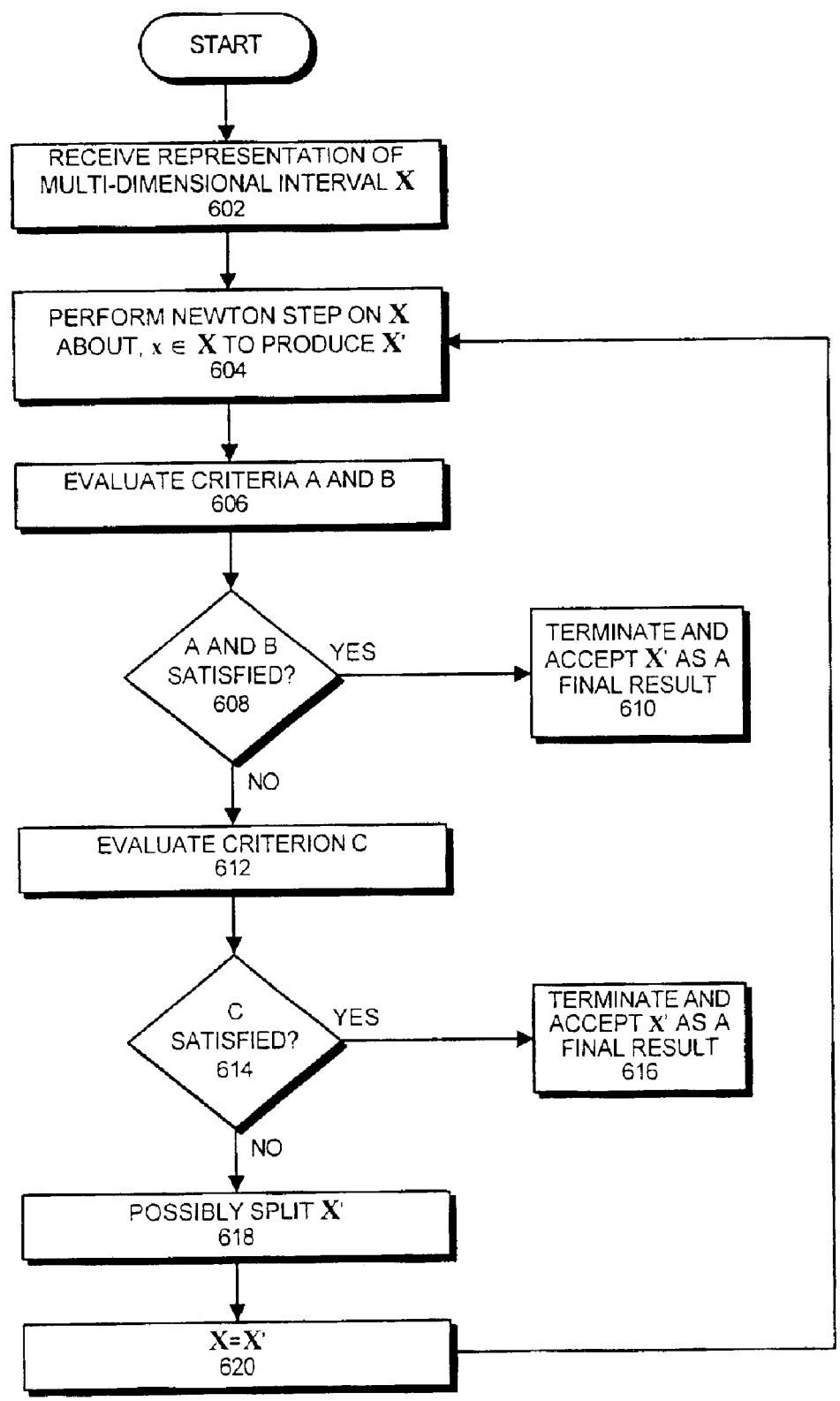
FIG. 6 illustrates a process of solving for zeros of a function that specifies a system of nonlinear equations using the interval Newton method in accordance with an embodiment of the present invention.

FIG. 6 illustrates the process of solving for zeros of a function that specifies a system of nonlinear equations using the interval Newton method in accordance with an embodiment of the present invention. The system starts with a multi-variable function $f(x)=0$, wherein x is a vector $(x_1, x_2, x_3, \ldots X_n)$, and wherein $f(x)=0$ represents a system of equations $f_1(x)=0, f_2(x)=0, f_3(x)=0, \ldots, f_n(x)=0$.

Next, the system receives a representation of an interval vector, X (step 602). In one embodiment of the present invention, for each dimension, i, the representation of $X_i$ includes a first floating-point number, $\alpha_i$, representing the left endpoint of $X_i$ in the i-th dimension, and a second floating-point number, $b_i$, representing the right endpoint of $X_i$.

The system then performs a Newton step on X, wherein the point of expansion is x, to compute a resulting interval $X'=N(x,X)$ (step 604).

Next, the system evaluates termination criteria A and B, which relate to the size of the box X and the function $f$, respectively (step 606). Criterion A is satisfied if the width of the interval X, w(X), is less than $\epsilon_X$ for some $\epsilon_X>0$, wherein w(X) is be defined as the maximum width of any component $X_1$ of the interval X. Note that $\epsilon_X$ is user-specified and is an absolute criterion. Criterion A can alternatively be a relative criterion $w(X)/|X|<\epsilon_X$ if the box X does not contain zero. Moreover, $\epsilon_X$ can be a vector, $\epsilon_X$, wherein there exists a separate component $\epsilon_{Xi}$ for each dimension in the interval vector X In this case, components containing zero can use absolute criteria, while other components use relative criteria.

Criterion B is satisfied if $\|f\|<\epsilon_F$ for some user-specified $\epsilon_F>0$, wherein $\|f\|=\max(|f_1(X)|, |f_2(X)|, |f_3(X)|, \ldots, |f_n(X)|)$. Note that as with $\epsilon_x$, element-specific values $\epsilon_{Fi}$ can be used, but they are always absolute.

However defined, criteria A and B are satisfied, the system terminates and accepts X' as a final bounding box for the zeros of $f$ (step 610). Otherwise, if either criterion A or criterion B is not satisfied, the system proceeds to evaluate criterion C (step 612).

Criterion C is satisfied if three conditions are satisfied. A first condition is satisfied if zero is contained within $f^1(x)$, wherein x is a point within the box X, and wherein $f^1(x)$ is a box that results from evaluating $f(x)$. Note that performing the interval Newton step in step 604 involves evaluating $f(x)$ to produce an interval result $f^1(x)$. Hence, $f^1(x)$ does not have to be recomputed in evaluating criterion C.

A second condition is satisfied if $M(x,X)=BJ(x,X)$ is regular. $J(x,X)$ is the Jacobian (matrix of second order partial derivatives) of the vector function $f$ with respect to the point x in the interval X. B is an approximate inverse of the center of $J(x,X)$. Note that multiplying $J(x,X)$ by B preconditions $J(x,X)$ so it is easier to determine whether $J(x,X)$ is regular. Hence, $M(x,X)$ is referred to as the "preconditioned" Jacobian. Note that $M(x,X)$ is regular if it is possible to invert $M(x,X)$ using a technique such as Gaussian elimination.

Finally, a third condition is satisfied if X=X'. This indicates that the interval Newton step (in step 604) failed to make progress.

If criterion C is satisfied, the system terminates and accepts X' as a final bounding box for the zeros of $f$ (step 616).

Otherwise, if criterion C is not satisfied, the system returns for another iteration. This may involve splitting X' into multiple intervals to be separately solved if the Newton step has not made sufficient progress to assure convergence at a reasonable rate (step 618). The system then sets X=X' (step 620) and returns to step 604 to perform another interval Newton step.

The above-described process works well if tolerances $\epsilon_X$ and $\epsilon_F$ are chosen "relatively large". In this case, processing stops early and computing effort is relatively small.

Figure 7:
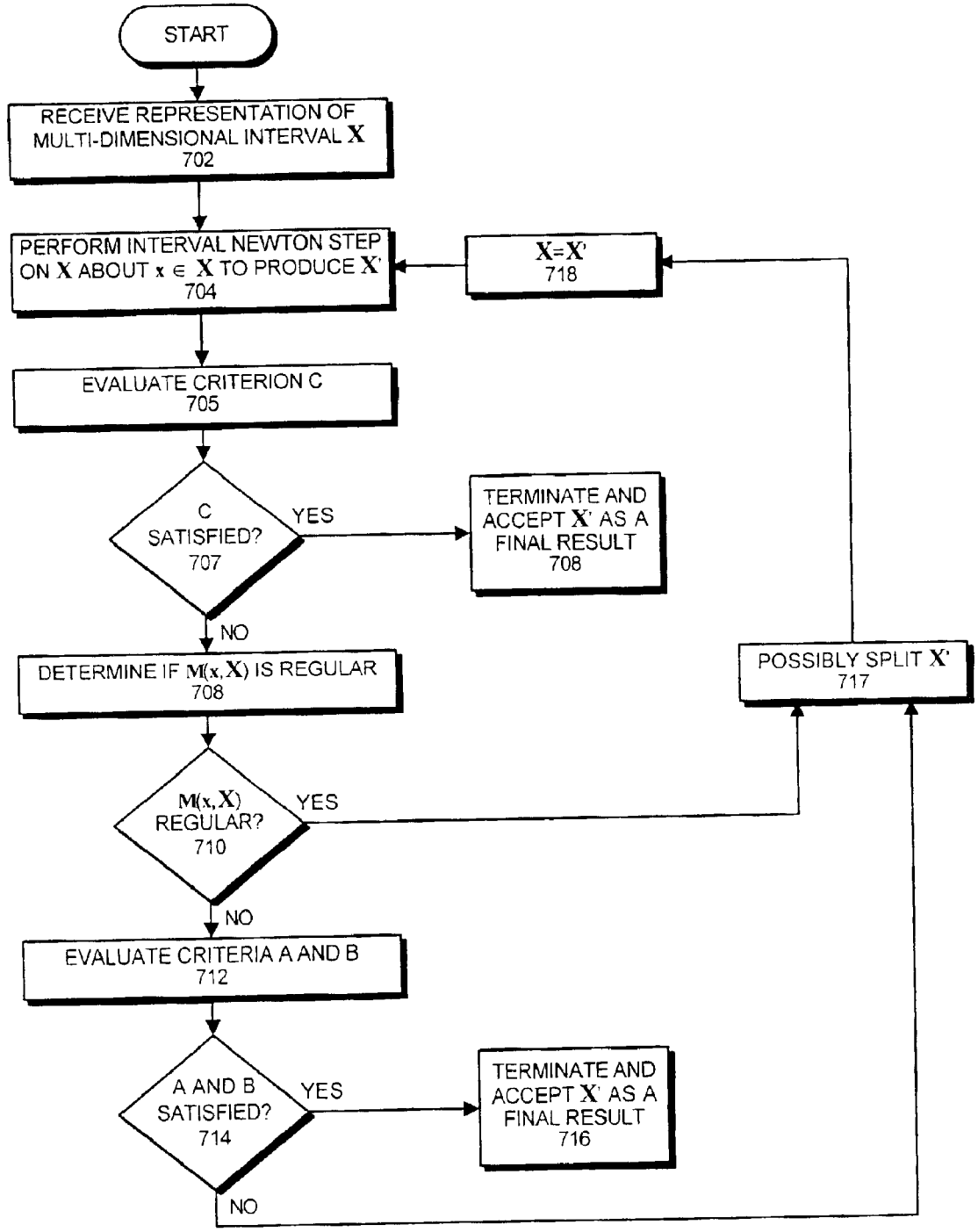
FIG. 7 illustrates another process of solving for zeros of a function that specifies a system of nonlinear equations using the interval Newton method in accordance with an embodiment of the present invention.

Alternatively, the process illustrated in FIG. 7 seeks to produce to best (or near best) possible result for simple zeros. The system starts with a multi-variable function $f(x)=0$. Next, the system receives a representation of an interval vector X (step 702). The system then performs a Newton step on X, wherein the point of expansion is x∈X, to compute a resulting interval $X'=N(x,X)$ (step 704).

Next, the system evaluates criterion C (step 705). If criterion C is satisfied, the system terminates and accepts X' as a final bounding box for the zeros of $f$ (step 708). Otherwise, if criterion C is not satisfied, the system proceeds to determine if $M(x,X)$ is regular (step 709).

If $M(x,X)$ is regular, the system returns for another iteration. This may involve splitting X' into multiple intervals to be separately solved if the Newton step has not made sufficient progress to assure convergence at a reasonable rate (step 717). The system also sets X=X' (step 718) before returning to step 704 to perform another interval Newton step.

If $M(x,X)$ is not regular, the system evaluates termination criteria A and B (step 712). If criteria A and B are satisfied, the system terminates and accepts X' as a final bounding box for the zeros of $f$ (step 716). Otherwise, if either criterion A or criterion B is not satisfied, the system returns for another iteration (steps 717 and 718).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a computer system to find the roots of a system of nonlinear equations within an interval vector X, wherein the system of non-linear equations is specified by a vector function, $f$, the method comprising:

receiving a representation of the interval vector X, wherein for each dimension, i, the representation of $X_i$ includes a first floating-point number, $\alpha_i$, representing the left endpoint of $X_i$, and a second floating-point number, $b_i$, representing the right endpoint of $X_i$;

storing the representation in a memory of the computer system;

performing an interval Newton step on X to produce a resulting interval vector, X', wherein the point of expansion of the interval Newton step is a point, x, within the interval X, and wherein performing the interval Newton step involves evaluating $f(x)$ to produce an interval result $f^1(x)$;

evaluating a first termination condition, wherein the first termination condition is TRUE if,
zero is contained within $f^1(x)$,
$J(x,X)$ is regular, wherein $J(x,X)$ is the Jacobian of the function $f$ evaluated with respect to x over the interval X, and
X is contained within X'; and if the first termination condition is TRUE, terminating the interval Newton method and recording X' in the memory as a final bound.

2. The method of claim 1, wherein if no termination condition is satisfied, the method further comprises returning to perform an interval Newton step on the interval X'.

3. The method of claim 2, wherein returning to perform an interval Newton step on the interval X' can involve splitting the interval X'.

4. The method of claim 1, further comprising:

evaluating a second termination condition;

wherein the second termination condition is TRUE if a function of the width of the interval X' is less than a pre-specified value, $\epsilon_x$, and the absolute value of the function, $f$, over the interval X' is less than a pre-specified value, $\epsilon_F$; and if the second termination condition is TRUE, terminating the interval Newton method and recording X' as a final bound.

5. The method of claim 4, wherein the second termination condition is evaluated and the method possibly terminates before the first termination condition is evaluated.

6. The method of claim 4, wherein the second termination condition is evaluated only if $J(x,X)$ is not proved to be regular.

7. The method of claim 6, further comprising determining if $J(x,X)$ is regular by computing a pre-conditioned Jacobian, $M(x,X)=BJ(x,X)$, wherein B is an approximate inverse of the center of $J(x,X)$, and then attempting to solve $M(x,X)(y-x)=r(x)$, where $r(x)=-Bf(x)$.

8. The method of claim 1, further comprising determining whether $J(x,X)$ is regular by attempting to solve the relation $M(x,X)(y-x)=r(x)$ using Gaussian elimination.

9. A computer-readable storage medium storing instructions that when executed by a computer cause the computer to perform a method for using a computer system to find the roots of a system of nonlinear equations within an interval vector X, wherein the system of non-linear equations is specified by a vector function, $f$, the method comprising:

receiving a representation of the interval vector X, wherein for each dimension, i, the representation of Xhd iincludes a first floating-point number, $\alpha_i$, representing the left endpoint of $X_i$, and a second floating-point number, $b_i$, representing the right endpoint of $X_i$;

performing an interval Newton step on X to produce a resulting interval vector, X', wherein the point of expansion of the interval Newton step is a point, x, within the interval X, and wherein performing the interval Newton step involves evaluating $f(x)$ to produce an interval result $f^1(x)$;

evaluating a first termination condition, wherein the first termination condition is TRUE if, zero is contained within $f^1(x)$, $J(x,X)$ is regular, wherein $J(x,X)$ is the Jacobian of the function $f$ evaluated with respect to x over the interval X, and X is contained within X'; and if the first termination condition is TRUE, terminating the interval Newton method and recording X' as a final bound.

10. The computer-readable storage medium of claim 9, wherein if no termination condition is satisfied, the method further comprises returning to perform an interval Newton step on the interval X'.

11. The computer-readable storage medium of claim 10, wherein returning to perform an interval Newton step on the interval X' can involve splitting the interval X'.

12. The computer-readable storage medium of claim 9, wherein the method further comprises:

evaluating a second termination condition;

wherein the second termination condition is TRUE if a function of the width of the interval X' is less than a pre-specified value, $\epsilon_x$, and the absolute value of the function, $f$, over the interval X' is less than a pre-specified value, $\epsilon_F$; and if the second termination condition is TRUE, terminating the interval Newton method and recording X' as a final bound.

13. The computer-readable storage medium of claim 12, wherein the second termination condition is evaluated and the method possibly terminates before the first termination condition is evaluated.

14. The computer-readable storage medium of claim 12, wherein the second termination condition is evaluated only if $J(x,X)$ is not proved to be regular.

15. The computer-readable storage medium of claim 14, wherein the method further comprises determining if $J(x,X)$ is regular by computing a pre-conditioned Jacobian, $M(x,X)=BJ(x,X)$, wherein B is an approximate inverse of the center of $J(x,X)$, and then attempting to solve $M(x,X)(y-x)=r(x)$, where $r(x)=-Bf(x)$.

16. The computer-readable storage medium of claim 9, wherein the method further comprises determining whether $J(x,X)$ is regular by attempting to solve the relation $M(x,X)(y-x)=r(x)$ using Gaussian elimination.

17. An apparatus that finds the roots of a system of nonlinear equations within an interval vector X, wherein the system of non-linear equations is specified by a vector function, $f$, the apparatus comprising:

a receiving mechanism that is configured to receive a representation of the interval vector X, wherein for each dimension, i, the representation of $X_i$ includes a first floating-point number, $\alpha_i$, representing the left endpoint of $X_i$, and a second floating-point number, $b_i$, representing the right endpoint of $X_i$;

a storing mechanism that is configured to store the representation in a memory of a computer system;

an interval Newton mechanism that is configured to perform an interval Newton step on X to produce a resulting interval vector, X', wherein the point of expansion of the interval Newton step is a point, x, within the interval X, and wherein performing the interval Newton step involves evaluating $f(x)$ to produce an interval result $f^1(x)$;

a termination mechanism that is configured to evaluate a first termination condition, wherein the first termination condition is TRUE if, zero is contained within $f^1(x)$, $J(x,X)$ is regular, wherein $J(x,X)$ is the Jacobian of the function $f$ evaluated with respect to x within the interval X, and X is contained within X'; and wherein if the first termination condition is TRUE, the termination mechanism is configured to terminate the interval Newton method and to record X' as a final bound in the memory.

18. The apparatus of claim 17, wherein if no termination condition is satisfied, the apparatus is configured to return to perform an interval Newton step on the interval X.

19. The apparatus of claim 18, wherein while returning to perform an interval Newton step on the interval X', the apparatus is configured to split the interval X'.

20. The apparatus of claim 17, wherein the termination mechanism is additionally configured to:

evaluate a second termination condition;

wherein the second termination condition is TRUE if a function of the width of the interval X' is less than a pre-specified value, $\epsilon_x$, and the absolute value of the function, $f$, over the interval X' is less than a pre-specified value, $\epsilon_F$; and wherein if the second termination condition is TRUE, the termination mechanism is configured to terminate the interval Newton method and to record X' as a final bound.

21. The apparatus of claim 20, wherein the termination mechanism is configured to evaluate the second termination condition, and possibly to terminate, before evaluating the first termination condition.

22. The apparatus of claim 20, wherein the termination mechanism is configured to evaluate the second termination condition only if $J(x,X)$ is not proved to be regular.

23. The apparatus of claim 22, the termination mechanism is configured to evaluate determine if $J(x,X)$ is regular by computing a pre-conditioned Jacobian, $M(x,X)=BJ(x,X)$, wherein B is an approximate inverse of the center of $J(x,X)$, and then attempting to solve $M(x,X)(y-x)=r(x)$, where $r(x)=-Bf(x)$.

24. The apparatus of claim 17, the termination mechanism is configured to determine whether $J(x,X)$ is regular by attempting to solve the relation $M(x,X)(y-x)=r(x)$ using Gaussian elimination.

* * * * *

UNITED STATES PATENT AND TRADEMARK OFFICE
CERTIFICATE OF CORRECTION

PATENT NO. : 6,920,472 B2
DATED : July 19, 2005
INVENTOR(S) : G. William Walster and Eldon R. Hansen It is certified that error appears in the above-identified patent and that said Letters Patent is hereby corrected as shown below:

<u>Title page,</u>
Item [57], ABSTRACT,
Line 19, please delete the word "fevaluated" and replace with the words
-- f evaluated --.
Lines 15 and 18, please delete the term, "$f^1(x)$" and replace with the term -- $f^J(x)$ --.

<u>Column 3,</u>
Lines 14 and 16, please delete the term, "$f^1(x)$" and replace with the term -- $f^J(x)$ --.

<u>Column 7,</u>
Lines 37, 38 and 41, please delete the term, "$f^1(x)$" and replace with the term -- $f^J(x)$ --.

<u>Column 8,</u>
Lines 51 and 54, please delete the term, "$f^1(x)$" and replace with the term -- $f^J(x)$ --.

<u>Column 9,</u>
Lines 42 and 45, please delete the term, "$f^1(x)$" and replace with the term -- $f^J(x)$ --.

<u>Column 10,</u>
Lines 40 and 45, please delete the term, "$f^1(x)$" and replace with the term -- $f^J(x)$ --.

Signed and Sealed this

Fourth Day of October , 2005

JON W. DUDAS
*Director of the United States Patent and Trademark Office*